Sept. 26, 1961 P. E. AXON ET AL 3,001,733

TAPE TRANSPORT MECHANISM IN MAGNETIC RECORDING AND/OR REPRODUCING APPARATUS

Filed April 13, 1959 2 Sheets-Sheet 1

INVENTORS.
PETER ERIC AXON
CECIL HENOCQ
BY DOUGLAS IRELAND
William J. Flynn
Attorney INVENTORS,
PETER ERIC AXON
CECIL HENOCQ
BY DOUGLAS IRELAND
William J. Flynn
Attorney United States Patent Office 3,001,733

Patented Sept. 26, 1961

3,001,733

TAPE TRANSPORT MECHANISM IN MAGNETIC RECORDING AND/OR REPRODUCING APPARATUS

Peter E. Axon, London, Cecil Henocq, Haywards Heath, and Douglas Ireland, London, England, assignors to Clevite Corporation, Cleveland, Ohio, a corporation of Ohio Filed Apr. 13, 1959, Ser. No. 806,123
Claims priority, application Great Britain Apr. 14, 1958
13 Claims. (Cl. 242—55.12)

This invention relates to a tape transport mechanism in a magnetic recording and/or reproducing apparatus in which the magnetic tape is advanced at high speed during recording or playback.

One practical technique for magnetically recording and reproducing television programs on tape requires that the tape be advanced at a speed of the order of 200 inches per second during recording and playback of the program. Because of the high speed at which the tape is advanced, there is a greatly increased tendency for breakage of the tape when started or stopped and, in the absence of special precautions to avoid such breakage of the tape, this would impose a serious limitation on the practical utility of such apparatus. The present invention is directed to a novel tape transport mechanism which is particularly adapted for advancing the tape at high speed and which minimizes the likelihood of breakage of the tape when started or stopped.

Accordingly, it is an object of this invention to provide a novel and improved tape transport mechanism which is arranged to minimize the likelihood of breakage of the tape when started or stopped.

It is also an object of this invention to provide such a novel tape transport mechanism which is particularly well adapted for use in magnetic recording and/or reproducing apparatus for recording or playing back television programs.

Further objects and advantages of this invention will be apparent from the following detailed description of a presently-preferred embodiment thereof, which is illustrated in the accompanying drawings.

Figure 1:
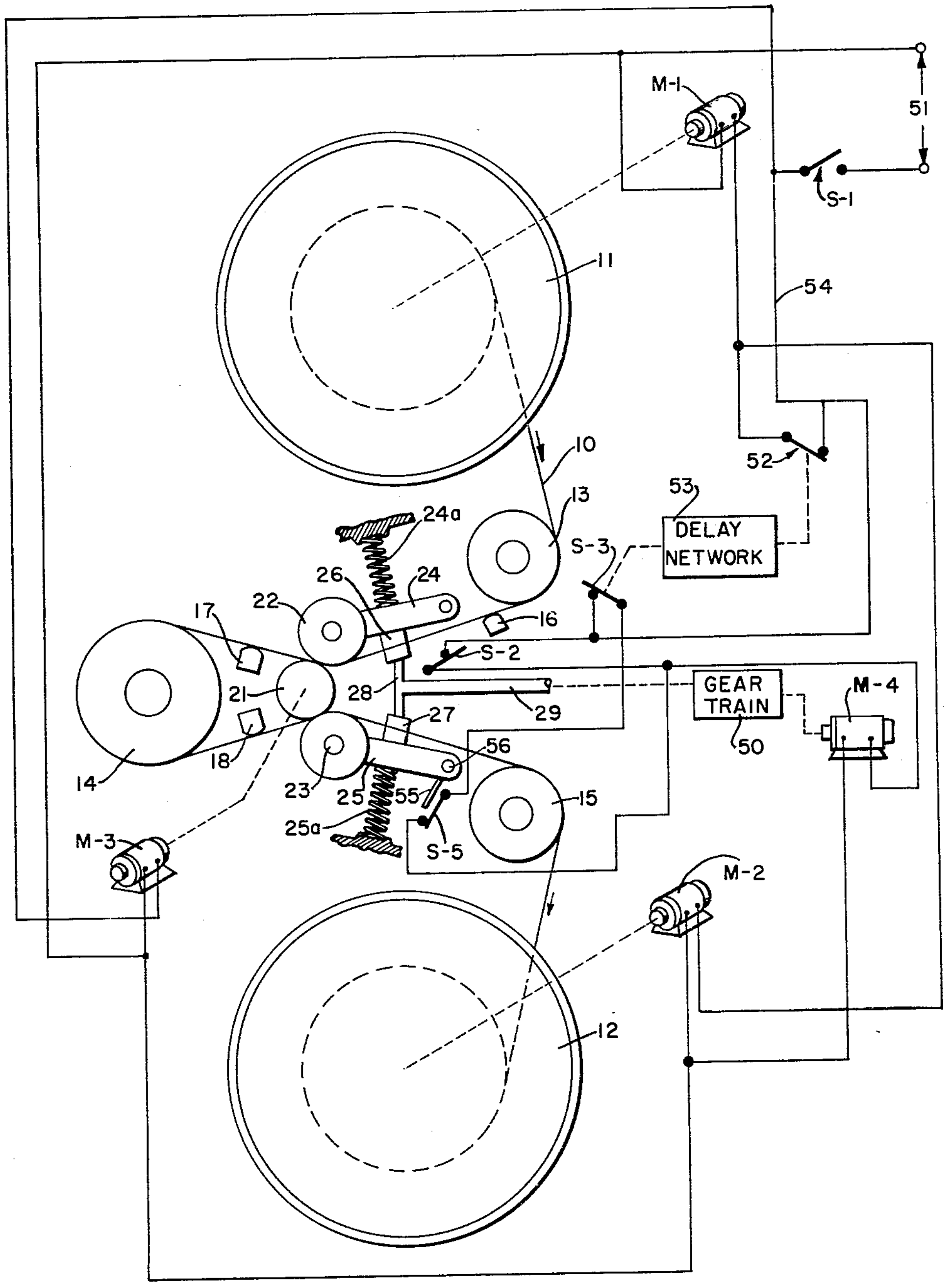
FIGURE 1 is a schematic view showing the tape transport mechanism of the present invention and showing a simplified schematic circuit diagram for the various drive motors in the tape transport mechanism.

Referring first to FIGURE 1, the tape transport mechanism includes a supply reel 11, a take-up reel 12, idler pulleys or guide rollers 13, 14 and 15 between the supply and take-up reels, and a capstan 21. The magnetic tape 10 is advanced from the supply reel 11 across pulley 13, past one side of capstan 21, around pulley 14, past the opposite side of capstan 21, and around pulley 15 to the take-up reel 12. An erase head 16 is located along the path of movement of the tape between the first pulley 13 and the capstan 21. A recording head 17 is located along the path of movement of the tape 10 just after the capstan 21 and ahead of the second pulley 14. A reproducing or playback head 18 is located along the path of movement of the magnetic tape after the second pulley 14 and just ahead of the opposite side of the capstan 21.

The supply and take-up reels 11 and 12 are driven respectively by electric motors M–1 and M–2. The motor M–1 applies a reverse torque to the supply reel 11, while motor M–2 applies a forward torque to the take-up reel which overcomes that reverse torque and causes the tape to be unwound from the supply reel and advanced along the described path of movement under tension. The respective torques supplied by these motors are varied as the tape is unwound from the supply reel and wound up on the take-up reel, so that the tape tension and speed due to their combined effect remain substantially constant throughout. This is accomplished by an arrangement which forms no part of the present invention and, hence, will not be described. The arrangement is such that the motor-driven reels 11 and 12 together provide enough power to advance the tape 10 at a speed just slightly less than the required speed for recording or playback. The remaining power required to bring the tape 10 up to its proper speed is to be supplied by the rotary capstan 21, which is driven by a suitable electric motor M–3. Pinch rollers or pressure rollers 22 and 23 are provided at the opposite sides of the capstan for selectively pinching the tape 10 against the capstan 21, so that the tape 10 may be advanced by the capstan at the required speed. The pinch rollers 22 and 23 are rotatably mounted respectively on pivoted arms 24 and 25, which are spring-biased by springs 24*a* and 25*a*, respectively, to position the respective pinch rollers 22 and 23 toward the capstan 21.

A cam arrangement, indicated schematically in its entirety by the reference element 28 in FIGURE 1, is provided for controlling the positions of the pinch rollers 22 and 23 in accordance with the present invention. This cam arrangement 28 is engaged by cam followers 26 and 27 which are mounted on the pinch roller-carrying arms 24 and 25, respectively. The cam arrangement 28 is mounted on a shaft 29 which is driven from a motor M–4 through a speed-reducing gear train 50, as indicated schematically in FIGURE 1.

The respective motors M–1, M–2, M–3 and M–4 are all connected to a suitable power supply 51 through a normally-open "start" switch S–1.

The respective reel motors M–1 and M–2 are connected in parallel with each other and have their energization controlled by a set of normally-closed contactors 52 operated by a delay network 53. The operation of the delay network 53 for opening the contactors 52 is initiated by closing a normally-open "stop" switch S–3.

The cam motor M–4 has a pair of alternate energization circuits. One such circuit is by way of the "start" switch S–1 through line 54 and a normally-closed switch S–2, which is positioned to be operated by the cam arrangement 28. The other energization circuit for the cam motor M–4 is by way of the "start" switch S–1 and line 54, the "stop" switch S–3 and a normally-closed switch S–5, which is positioned to be operated by a lever 55 on the shaft 56 which carries the arm 25 for the pinch roller 23.

The energization circuits for the various motors in the tape transport mechanism may be summarized as follows:

The capstan motor M–3 is under the control of the "start" switch S–1 only.

The reel motors M–1 and M–2 are both under the joint control of the "start" switch S–1 and the contactors 52, which are operated from the "stop" switch S–3 through the delay network 53.

The cam motor M–4 is under the control of the "start" switch S–1 and either the cam-operated switch S–2 or the series-connected "stop" switch S–3 and the lever-operated switch S–5.

Figures 2, 3:
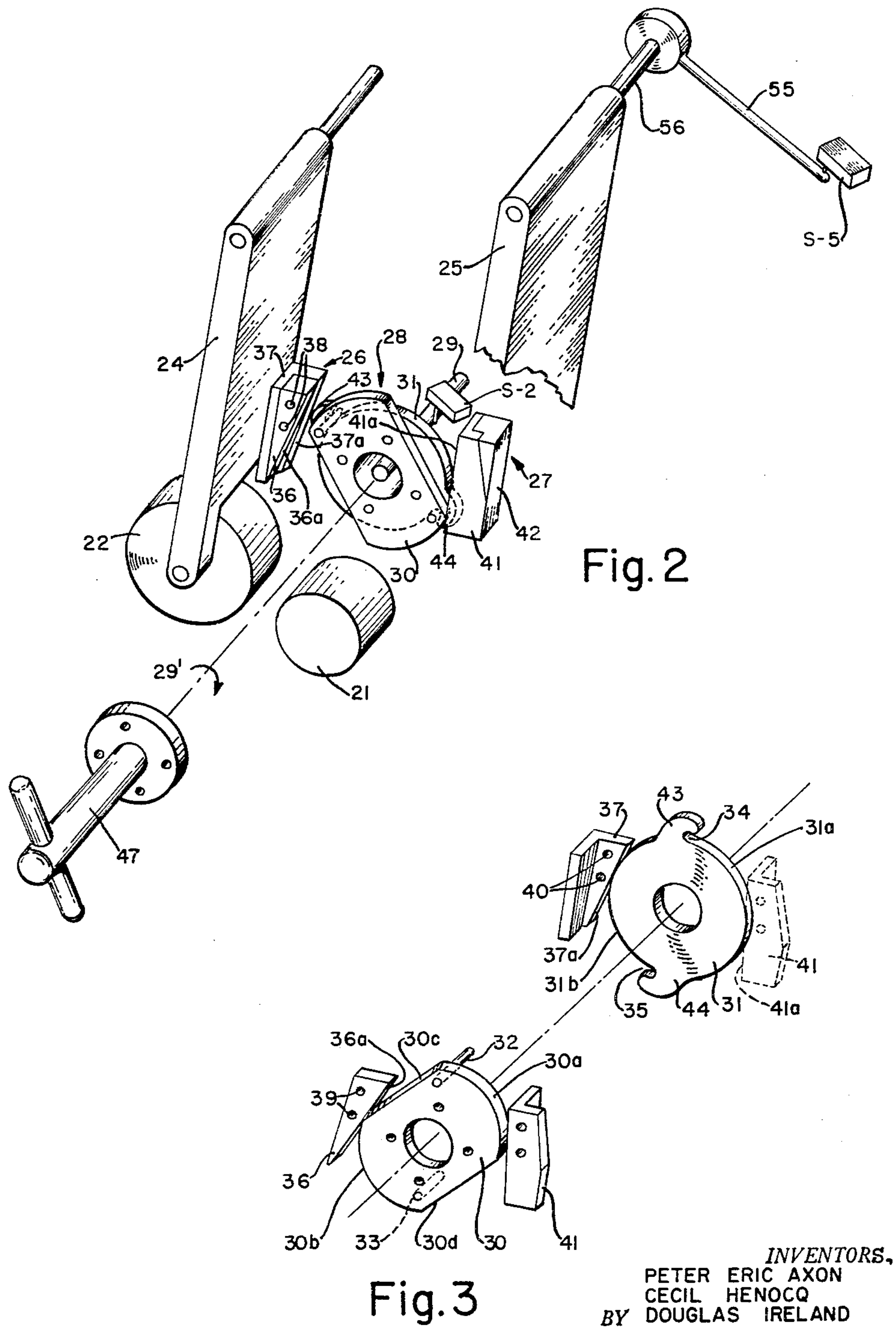
FIGURE 2 is a fragmentary exploded perspective view of the portion of this tape transport mechanism which controls the engagement of the magnetic tape with the capstan which drives it.
FIGURE 3 is a fragmentary exploded perspective view of the cam assembly in this portion of the tape transport mechanism.

Turning now to FIGURES 2 and 3, the cam arrangement, indicated in its entirety at 28 in FIGURE 1, is composed of two separate cam members 30 and 31 mounted contiguous to one another on the cam shaft 29. The cam 31 is rigidly affixed to shaft 29. Cam 30 is rotatably mounted on shaft 29 and carries two axially projecting pins 32 and 33 (FIGURE 3) which engages in corresponding slots 34 and 35 on the other cam member 31. Through this pin and slot coupling, normally the cam 30 is coupled to the cam 31 so as to rotate in unison therewith when the cam shaft 29 is driven from its motor M–4. The direction of rotation of the cam shaft and the cams is indicated by the arrow 29′ in FIGURE 2.

The cam 30 is formed with a pair of diametrically opposed peripheral segments 30*a* and 30*b* which are segments of a circle having the axis of the cam shaft 29 at its center. The ends of the respective circular segments of this cam are interconnected by straight segments 30*c* and 30*d*, respectively, which are chords of the same circle.

The other cam member 31 throughout most of its peripheral extent is oblate circular in outline, the center of this circle being the axis of the cam shaft 29. A pair of diametrically opposed raised portions or projections 43 and 44 project outwardly beyond the circular portions 31*a* and 31*b* on the periphery of cam 31. As best seen in FIGURE 3, these raised portions 43 and 44 are approximately hook-shaped and they thereby provide the aforementioned slots 34 and 35 which receive the pins 32 and 33 projecting from the cam member 30.

When the cams 30 and 31 are assembled face-to-face, as shown in FIGURE 2, the circular segments 30*a* and 30*b* on the periphery of cam 30 are disposed radially outward beyond the circular portions 31*a* and 31*b* on cam 31, but are disposed inward from the outer ends of the raised portions 43 and 44 on cam 31.

The cam follower 26, which is mounted on the arm 24 which carries the pinch roller 22, is composed of two parts. The first part is a block 36, which is of triangular outline viewed axially, as shown in FIGURE 3. This block 36 presents an inclined flat face 36*a* which is positioned to engage the periphery of the cam 30. The other part of the cam follower 26 is a piece 37 which is generally L-shaped in cross section. This piece presents an inclined flat face 37*a* which engages the periphery of the other cam 31. The block 36 is seated in the recess formed in the L of the piece 37, being attached thereto by means of two screws 38 (FIGURE 2) which pass through holes 39 (FIGURE 3) in the block 36 and are screwed into tapped holes 40 in the piece 37. The holes 39 are of larger diameter than the screws 38, thus allowing for a slight adjustment of the block 36 with respect to the piece 37. The piece 37 of cam follower 26 is mounted directly on the pinch roller-carrying arm 24.

The cam follower 27 on the arm 25 which carries the other pinch roller 23 is composed of two members, 41 and 42, which are both generally L-shaped in cross section. The inner member 41 presents a flat inner face 41*a* which is positioned to be engaged by the peripheries of both cams 30 and 31. The follower member 41 is mounted on the member 42 so as to be adjustable in a manner similar to the adjustable mounting of the block 36 on the piece 37 of the other cam follower, as just described. The block 42 is mounted directly on the pinch roller-carrying arm 25.

As shown in FIGURE 2, a handle 47 is fixed to the cam 30, such as by being bolted thereto. When the cam shaft 29 is at rest, turning the handle 47 in the direction of the arrow 29′ (clockwise in FIGURE 2) will result in turning the cam 30 independent of the cam 31 which is mounted directly on the cam shaft.

The previously-mentioned normally-closed switch S–2 is a small, precision, snap acting switch which has its actuator positioned in the path of movement of the raised portions 43 and 44 on the cam 31. When the cam 31 turns clockwise through one-quarter turn from the starting position shown in FIGURE 2, it engages this actuator to open switch S–2.

The shaft 56, on which the roller-carrying arm 25 is rigidly mounted, carries a lever 55 which is adapted to operate the similar normally-closed switch S–5.

In the operation of this tape transport mechanism, initially the cam device and the cam followers are in the position shown in FIGURE 2. In this position of the parts, the pinch rollers 22 and 23 are maintained out of engagement with the magnetic tape 10 and therefore the magnetic tape does not engage the capstan 21. At this time, that is, before the machine is started, the control circuit for the various motors is in the condition shown in FIGURE 1.

To start the machine, the "start" switch S–1 is closed. Immediately the reel motors M–1 and M–2 are energized, as are the capstan motor M–3 and the cam motor M–4. At this time, the cam motor is energized by way of lines 54 and the normally-closed switch S–2. The cam shaft 29 is driven relatively slowly through the speed reduction gear train 50, counterclockwise in FIGURES 2 and 3. The reel motors M–1 and M–2 accelerate to their full speed before the projections 43 and 44 on cam 31 have moved away from engagement with the respective cam followers 26 and 27. Therefore, while the cam device 28 maintains the pinch rollers 22 and 23 away from engagement with the magnetic tape 10, the reels 11 and 12 will have accelerated to full speed and the magnetic tape 10 will be advancing at a speed just slightly less than the speed required for the recording or playback operation. Also, the capstan 21 will be rotating at its full speed, though out of engagement with the tape 10.

As rotating of the cam device continues through the slow speed drive from cam motor M–4, the raised portion 44 on cam 31 moves away from the cam follower 27, permitting the corresponding pinch roller 23 to first engage the magnetic tape 10 and press it into light engagement against the capstan 21. As the rotation of the cam device continues, the cam projection 44 moves completely away from engagement with the cam follower 27 and the corresponding pinch roller 23 is pressed tightly against the magnetic tape 10, due to the urging of the spring 25*a*. This positions the tape in full driving engagement with one side of the capstan 21 and establishes the required final speed and tension of the tape. Following this, the raised portion 43 on cam 31 moves away from engagement with the cam follower 26, so that the other pinch roller 22 moves inward toward the opposite side of the capstan 21 and forces the magnetic tape 10 tightly against that side of the capstan in full driving engagement therewith. This sequential operation of the pinch rollers takes place in the manner described because of the shape of the cam 31 and the positions of the cam followers 27 and 26 with respect to the raised portions on the cam 31.

With the tape 10 now pinched against the capstan 21 by the pinch rollers 22 and 23, there is a captive loop portion of the tape formed between the pinch rollers and this captive loop is mechanically isolated from the remainder of the tape. The captive loop portion of the tape now assumes the same linear speed as the peripheral speed of the capstan 21. Thus, this captive loop portion of the magnetic tape moves over the transducer heads 17 and 18 at a uniform speed determined by the speed of the capstan 21. This final speed of the tape is only slightly greater than the speed at which it was moving just before being pinched against the capstan 21. As soon as the pinch rollers 22 and 23 pinch the tape against the capstan to provide the mechanically isolated captive loop in the tape, as described, this action reduces the drag which the tape has been exerting on the take-up reel motor M–2. As with any conventional electric motor, the motor M–2 tends to speed up as its load is reduced. Therefore, the take-up reel 12 speeds up enough to avoid a bunching of the tape between the capstan and the take-up reel.

Thus, it will be seen that, starting from a stationary condition, the tape is first accelerated by the reels 11 and 12 to a speed just slightly below its final required speed, after which the tape is then brought into engagement with the capstan and is brought up to its final speed by the capstan. This gradual process has been found in practice to minimize the likelihood of breakage of the tape when it is started from a stationary condition and brought up to the relatively high speed of the order of 200 inches per second, as is involved in the recording of television programs.

After the tape has been brought up to its full required speed, as described, the cams 30 and 31 will continue to turn until they have completed one-quarter turn from the starting position shown in FIGURE 2. At this time, the raised portion 43 on cam 31 opens the switch S–2, thereby deenergizing the cam motor M–4 and stopping the rotation of the cam. As long as this condition prevails, the pinch rollers 22 and 23 will continue to hold the magnetic tape 10 against the capstan and the tape will be driven by the capstan at its required speed past the transducer heads 17 and 18. This condition prevails as long as it is desired to continue the operation of the machine, either for recording or playing back the television program.

When the program is over or it is otherwise desired to stop the machine, the "stop" switch S–3 is closed. This action first completes an energization circuit for the cam motor M–4, by way of switches S–3 and S–5. The cam motor starts up and turns the cams 30 and 31 clockwise in FIGURES 2 and 3. The outermost, circular portions 30*a* and 30*b* on cam 30 engage the respective cam followers 27 and 26, moving the latter outward and causing the respective pinch rollers 23 and 22 to be moved outward away from engagement with the magnetic tape 10. Accordingly, the tape 10 is disengaged from the capstan 21 and the tape begins to slow down slightly. As soon as the pinch rollers are thus disengaged from the tape, the contactors 52, which control the energization of the reel motors M–1 and M–2, are opened through the delay network 53 which is operated by the closing of switch S–3. Accordingly, the reel motors M–1 and M–2 are deenergized. At the same time, brakes are simultaneously applied to the reel motors, the reel motor M–1 being braked more heavily than the other in order to prevent the tape from being thrown out of the supply reel 11 as it slows down.

Following this, the raised portions 43 and 44 on the cam 31 engage the respective cam followers 27 and 26, moving the pinch rollers 23 and 22 even farther away from the magnetic tape 10 and the capstan. The cam followers 26 and 27, the arms 24 and 25 and the pinch rollers 22 and 23 now are in the starting position shown in FIGURE 2. The cams 30 and 31 are in the same position, except turned 180°. By such final outward movement of the arm 25, the lever 55 thereon is moved to a position where it opens the normally closed switch S–5 in the energization circuit for the cam motor M–4. Accordingly, the cam motor is stopped.

In order to shut down the machine completely, the "start" switch S–1 may be opened, thereby deenergizing the capstan motor M–3.

It will be apparent from the foregoing that the full cycle of operation of the machine between starting and stopping involves one-half turn of the cam shaft 29 and the cams thereon.

Emergency disengagement of the pinch rollers 22 and 23 is provided by the ability of cam 30 to be moved with respect to cam 31. Thus, simply by grasping and turning the handle 47 clockwise in FIGURE 2 the cam 30 may be turned to disengage the pinch rollers 22 and 23 from the tape. Accordingly, damage to the pinch rollers can be avoided in the event of a power failure, when the pinch rollers would otherwise be left pinching the tape against the capstan 21. When the power is restored or when the handle 47 has been thus operated in any other circumstances, the apparatus must be restored to the correct position for restarting by rotating cam 30 counterclockwise in FIGURE 2 to assume its correct position with respect to cam 31.

From the foregoing, it will be apparent that the illustrated mechanism is particularly well adapted for the accomplishment of the stated purposes of this invention. However, while there has been described in detail herein and illustrated in the accompanying drawing a specific presently-preferred embodiment of this invention, it is to be understood that various modifications, omissions, and refinements which depart from the disclosed embodiment may be adopted without departing from the spirit and scope of this invention.

Having thus described our invention, we claim:

1. In a tape transport mechanism having a rotary supply reel and a rotary take-up reel, the improvement which comprises means for driving said reels at speeds effective to advance the tape from the supply reel to the take-up reel under the action of the reels only at a speed slightly less than the required speed, a rotary capstan located along the path of movement of the tape between the supply and take-up reels, means for driving the capstan at a peripheral speed equal to the required speed for the tape, a pair of pinch rollers located at opposite sides of the capstan and at the opposite face of the tape from the capstan and mounted to selectively pinch the tape against said opposite sides of the capstan, movable cam means, a pair of cam followers which engage said cam means and which are coupled respectively to said pinch rollers to control the respective positions of the latter, and means operative when the supply and take-up reels are started rotating to cause said cam means to maintain the respective cam followers positioned to hold the pinch rollers away from the tape-pinching positions until the tape has reached said speed slightly less than the capstan speed, said last mentioned means being operative after the tape has reached said slightly less speed to move said cam means to permit the pinch rollers to pinch the tape against the capstan.

2. The tape transport mechanism of claim 1 wherein said cam means is rotatable between the cam followers.

3. The tape transport mechanism of claim 1 wherein said last mentioned means is operative to permit one of said pinch rollers to move into a position in which it pinches the tape against the capstan, and thereafter to permit the other of said pinch rollers to move into the position in which it pinches the tape against the capstan.

4. The tape transport mechanism of claim 1 wherein there is provided means for stopping said cam means after the pinch rollers have moved into pinching engagement of the tape against the capstan.

5. In a tape transport mechanism having a rotary supply reel and a rotary take-up reel, the improvement which comprises means for driving said reels at speeds effective to advance the tape from the supply reel to the take-up reel under the action of the reels only at a speed slightly less than the required speed, a rotary capstan located along the path of movement of the tape between the supply and take-up reels, means for driving the capstan at a peripheral speed equal to said required speed for the tape, a pair of pinch rollers located at opposite sides of the capstan and at the opposite face of the tape from the capstan and mounted to selectively pinch the tape against said opposite sides of the capstan, movable cam means, a pair of cam followers which engage said cam means and which are coupled respectively to said pinch rollers to control the respective positions of the latter, said cam means being positioned to permit the pinch rollers to pinch the tape against the capstan during a tape-advancing operation, and means operative, when it is desired to stop the tape, to first move said cam means to cause said pinch rollers to permit the tape to disengage from the capstan and thereafter to stop said reels.

6. The mechanism of claim 5 wherein said cam means is rotatable between said cam followers.

7. In a tape transport mechanism for magnetic recording and/or reproducing apparatus adapted to record a television program on magnetic tape and to play back the recorded program from the tape, said tape transport mechanism including rotary supply and take-up reels for the tape, the improvement which comprises means for driving said reels at speeds effective to advance the tape along a predetermined path of movement from the supply reel to the take-up reel under the influence of the reels only at a speed slightly less than the speed required for recording or playback, a rotary capstan located along said path of movement of the tape inside a loop portion formed by the tape, means for driving the capstan at a peripheral speed equal to said required tape speed, a pair of pinch rollers located outside said loop portion of the tape and at opposite sides of the capstan, spring means biasing said pinch rollers toward the capstan to pinch the tape against said opposite sides of the capstan so that the tape is driven by the capstan and said loop portion of the tape is isolated mechanically from the remainder of the tape, a pair of pivoted arms which support said pinch rollers individually, cam followers mounted respectively on said arms, cam means rotatable between said cam followers and engaging the latter, and drive means for rotating said cam means to control the respective positions of said pinch rollers, said cam means prior to the start of said reel being positioned to maintain said pinch rollers both out of engagement with the tape, said cam means being operative following the start of said reels to maintain both pinch rollers disengaged from the tape until the tape has reached said speed slightly less than its required speed, said cam means being operative after the tape has reached said slightly less speed to permit one of said pinch rollers first to engage the tape lightly and thereafter to pinch the tape against the capstan so that the tape speed and tension are determined by the capstan, said cam means being operative thereafter to permit the other of said pinch rollers to pinch the tape against the capstan so as to isolate said loop portion of the tape mechanically from the remainder of the tape.

8. The tape transport mechanism of claim 7 wherein said cam means comprises two cams, each of said cams having provision for engagement with the cam followers to disengage the tape from the capstan, one of said cams being coupled to said cam drive means, the other of said cams having means for coupling engagement with said one cam and separable therefrom so that said other cam can be rotated independent of said one cam to disengage the tape from the capstan independent of said cam drive means.

9. The tape transport mechanism of claim 7, wherein there is provided means for stopping said cam means from rotating after both pinch rollers have engaged the tape.

10. The tape transport mechanism of claim 9 wherein there is provided tape stopping means including means for resuming the rotation of said cam means to first cause both pinch rollers to release the tape from driving engagement with the capstan and thereafter to stop said reels.

11. In a tape transport mechanism comprising first drive means for advancing a tape along a predetermined path of travel, a rotary capstan located along said path of travel of the tape inside a loop formed by the tape, means for driving said capstan at a peripheral speed equal to the speed required for the tape, a pair of pressure members located outside said loop in the tape and on opposite sides of the capstan, and means operative when said first drive means starts advancing the tape for initially maintaining both said pressure members away from pressure engagement against the tape, said last-mentioned means being operative after a time delay following the starting of the tape first to permit only one of said pressure members to pinch the tape against the adjacent side of the capstan and thereafter to permit the other of said pressure members to pinch the tape against the opposite side of the capstan.

12. In a tape transport mechanism having a rotary supply reel and a rotary takeup reel for the tape, the improvement which comprises means for driving said reels at speeds effective to advance the tape along a predetermined path of movement from the supply reel to the takeup reel under the influence of the reels only at a speed slightly lower than the required speed, a rotary capstan located along said path of movement of the tape inside a loop formed by the tape, means for driving the capstan at a peripheral speed equal to said required tape speed, a pair of pinch rollers located outside said loop in the tape and on opposite sides of the capstan, and means operative while said reels start to advance the tape for maintaining both pinch rollers away from pressure engagement against the tape until the tape has reached said slightly lower speed under the influence of said reels, said last-mentioned means being operative after the tape has reached said slightly lower speed to permit only one of said pinch rollers first to engage the tape lightly and thereafter to pinch the tape against the adjacent side of the capstan so that the tape speed and tension are determined by the capstan, said last-mentioned means being operative thereafter to permit the other of said pinch rollers to pinch the tape against the opposite side of the capstan so as to isolate said loop in the tape mechanically from the remainder of the tape.

13. The tape transport mechanism of claim 12 wherein said one pinch roller which first pinches the tape against the capstan is positioned closer to the takeup reel than to the supply reel along said path of movement of the tape, and said other pinch roller is positioned closer to the supply reel than to the takeup reel along said path of movement.

References Cited in the file of this patent

UNITED STATES PATENTS

| | | |
|---|---|---|
| 2,668,674 | Roberts | Feb. 9, 1954 |
| 2,714,512 | Reed | Aug. 2, 1955 |
| 2,815,907 | McCormick | Dec. 10, 1957 |
| 2,909,337 | Lahti et al. | Oct. 20, 1959 |